United States Patent
Olechowski, III et al.

(10) Patent No.: US 11,151,598 B2
(45) Date of Patent: Oct. 19, 2021

(54) SCORING IMAGE ENGAGEMENT IN DIGITAL MEDIA

(71) Applicant: Blinkfire Analytics, Inc., Glen Ellyn, IL (US)

(72) Inventors: Stephen Joseph Olechowski, III, Glen Ellyn, IL (US); Nan Jiang, Lincolnshire, IL (US); Alejandro Tatay de Pascual, Valencia (ES)

(73) Assignee: Blinkfire Analytics, Inc., Glen Ellyn, IL (US)

( * ) Notice: Subject to any disclaimer, the term of this patent is extended or adjusted under 35 U.S.C. 154(b) by 543 days.

(21) Appl. No.: 14/998,097

(22) Filed: Dec. 23, 2015

(65) Prior Publication Data

US 2016/0189200 A1 Jun. 30, 2016

Related U.S. Application Data

(60) Provisional application No. 62/098,246, filed on Dec. 30, 2014.

(51) Int. Cl.
*G06Q 30/02* (2012.01)
*G06Q 50/00* (2012.01)

(52) U.S. Cl.
CPC ......... *G06Q 30/0242* (2013.01); *G06Q 50/01* (2013.01)

(58) Field of Classification Search
USPC .............................. 705/7.31, 23, 14.1; 14/46
See application file for complete search history.

(56) References Cited

U.S. PATENT DOCUMENTS

| | | | |
|---|---|---|---|
| 9,875,234 B2* | 1/2018 | Myslinski | G06F 17/277 |
| 10,192,131 B2 | 1/2019 | Olechowski et al. | |
| 10,762,374 B2 | 9/2020 | Olechowski, III et al. | |
| 2005/0018904 A1 | 1/2005 | Davis | |
| 2007/0022329 A1 | 1/2007 | Adamek et al. | |
| 2008/0144942 A1 | 6/2008 | Besley et al. | |
| 2009/0123025 A1 | 5/2009 | Deng et al. | |
| 2011/0145064 A1* | 6/2011 | Anderson | G06Q 30/02 705/14.53 |
| 2012/0263385 A1* | 10/2012 | van Zwol | G06K 9/6202 382/201 |
| 2012/0284105 A1 | 11/2012 | Li | |
| 2013/0073388 A1* | 3/2013 | Heath | G06Q 30/02 705/14.53 |
| 2013/0085803 A1* | 4/2013 | Mauro | G06Q 30/0201 705/7.29 |
| 2013/0325550 A1* | 12/2013 | Varghese | H04W 4/21 705/7.31 |
| 2014/0052527 A1 | 2/2014 | Roundtree | |
| 2014/0052555 A1* | 2/2014 | Macintosh | G06Q 20/208 705/23 |
| 2014/0219569 A1 | 8/2014 | Manson et al. | |
| 2015/0023602 A1 | 1/2015 | Wnuk et al. | |
| 2015/0332317 A1* | 11/2015 | Cui | G06Q 30/0247 705/14.46 |
| 2016/0042253 A1* | 2/2016 | Sawhney | G06K 9/6255 382/190 |
| 2016/0239719 A1 | 8/2016 | Olechowski et al. | |
| 2018/0349726 A1 | 12/2018 | Olechowski et al. | |

* cited by examiner

*Primary Examiner* — Afaf Osman Bilal Ahmed
(74) *Attorney, Agent, or Firm* — Carr & Ferrell LLP

(57) ABSTRACT

A system may monitor social media sites for posts comprising brand indicia and collect analytics data related to the posts. Brand exposure may be quantified based on the analytics data.

43 Claims, 19 Drawing Sheets

SCORING IMAGE ENGAGEMENT IN DIGITAL MEDIA

CROSS-REFERENCE TO RELATED APPLICATIONS

The present application claims priority to provisional U.S. Patent Application Ser. No. 62/098,246, filed on Dec. 30, 2014, titled "Scoring Image Engagement in Digital Media," and is related to U.S. patent application Ser. No. 14/998,289, filed on Dec. 23, 2015, titled "High Accuracy Image Identification System," which are hereby incorporated by reference in their entirety.

FIELD OF THE INVENTION

The present disclosure relates generally to the field of data analytics, and more specifically to systems and methods for quantifying image exposure.

SUMMARY

Various embodiments of the present disclosure may be directed to a secure autonomous intelligent agent server performing a method. The method may comprise monitoring social media sites for posts comprising brand indicia. Analytics data related to the social media posts may be collected, and the analytics data related to each brand indicia may be compiled. Brand exposure may be quantified based on the compiled analytics data.

According to additional exemplary embodiments, the present disclosure may be directed to a secure autonomous intelligent agent server performing a method. The method may comprise compiling a database of known brand indicia. A network may be scanned for social media posts comprising unidentified brand indicia, and then the unidentified brand indicia may be downloaded. The unknown brand indicia may be matched to one or more of the known brand indicia. Analytics data related to each brand indicia may be collected, and social media engagement of the brand indicia may be assessed based on the analytics data.

According to still further exemplary embodiments, the present disclosure may be directed to a secure autonomous intelligent agent server performing a method. The method may comprise monitoring social media sites for posts comprising image or video representations of brand indicia. Analytics data related to a frequency that social media site users engage the brand indicia on each social media site may be collected. Social media engagement of the brand indicia may be assessed based on the analytics data. Marketing exposure of the brand indicia may be quantified based on the social media engagement.

According to still further exemplary embodiments, the present disclosure may be directed to non-transitory computer readable media as executed by a system controller comprising a specialized chip to perform a method. The method may comprise monitoring social media sites for posts comprising brand indicia. Analytics data related to the social media posts may be collected, and the analytics data related to each brand indicia may be compiled. Brand exposure may be quantified based on the compiled analytics data.

DETAILED DESCRIPTION

Figure 1:
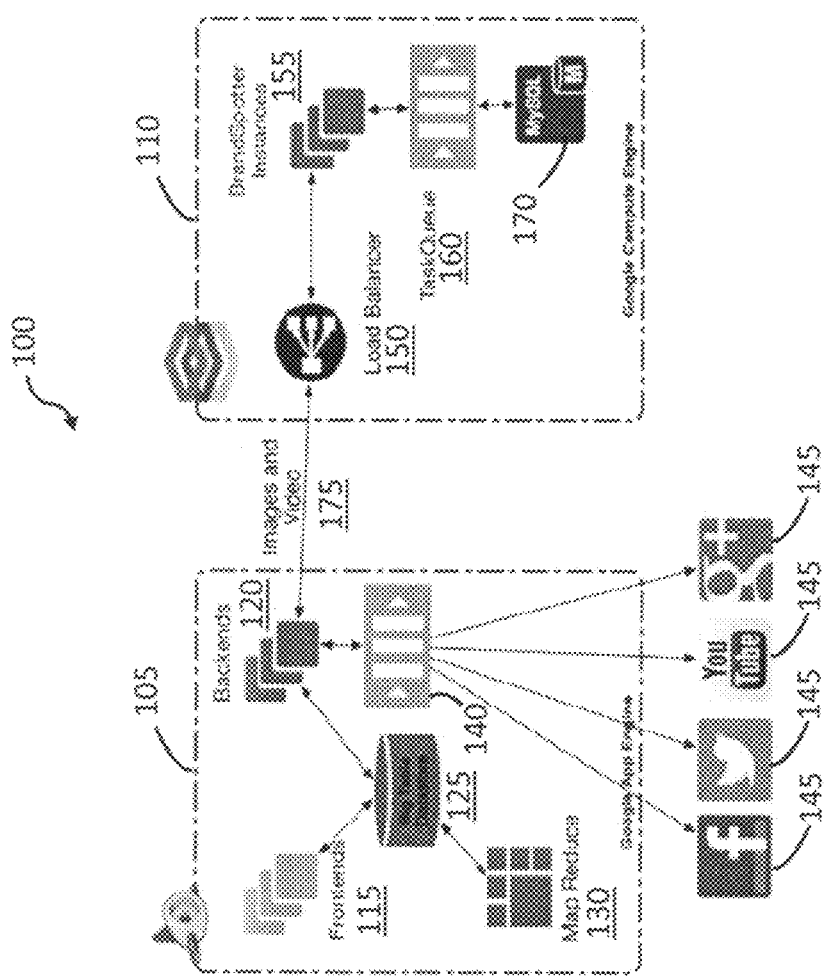
FIG. 1 is a schematic diagram an exemplary system for scoring image engagement according to various embodiments.

Social media sites have become an integral component of social interchange for nearly every person who uses a smart device. Social media provides users with channels to maintain a near real-time focus on people, events, things, products, organizations, and teams. Because so many individuals have woven social media into the fabric of their daily lives, it was inevitable that marketing efforts would soon follow. Advertising through social media channels has now become a major component of the marketing plans for most companies and organizations, whether on a broad corporate level or for individual products and services. Marketing investments may take the form of direct usage of social media, such as a Facebook page dedicated to a product, or indirectly through sponsorships and advertising that appears on social media channels secondarily, such as photos and videos of a sporting event with a sponsor's logo in the background.

Because of the heavy investment made by companies and organization to promote products and services through these social media channels, it is important to measure the impact the marketing efforts are having and whether that impact portrays the product or service in a positive light. It may also be relevant for a company to understand how the impact of their social media marketing efforts compares to that of their competitors. The present disclosure describes various embodiments of systems and methods for scoring the impact specific products, services, names, events, and the like have within the digital world suing data analytics algorithms.

According to various embodiments, an initial step in the data analytics systems and methods is to identify predetermined digital images (single images or video, or more generally, rich media) or alphanumeric strings. While the disclosure herein is focused on images, the scope of the systems and methods described applies equally to alphanumeric strings, such as hashtags, and to shapes, such as a face or the distinctive shape of a Coca-Cola bottle.

Humans are able to identify objects with relative ease, even when the object is viewed as a cluttered, occluded, and unfocused image, and under varying lighting conditions. Mimicking human object recognition has proven difficult, likely because the human brain uses a number of different techniques in the identification process. Shape, texture, color, context, and many other inputs are likely sorted and matched by various techniques in the brain to known objects and then a decision is made as to the identity of the unknown object.

Image identification or recognition systems may be used to automate identification of an image, photo or likeness or a person or physical object. These systems primarily operate by using a comparison of a variety of features. For example, facial recognition systems may evaluate facial shape and the relative location of eyes, nose and mouth on the face of an unidentified photo and compare these values to similar values for photos if known persons. A variety of algorithms and techniques have been devised to automate the identification process.

The disclosure of related U.S. patent application Ser. No. 14/998,289, filed on Dec. 23, 2015, titled "High Accuracy Image Identification System," incorporated herein by reference in its entirety, is directed to various embodiments of systems and methods for high accuracy image identification. Various embodiments may be used to identify logos in images posted on a network, such as images posted on social media sites such as Facebook, Twitter, Flickr, LinkedIn, Pinterest, Instagram, Tagged, and the like. In order to identify unidentified logos, a database may first be established of known logos. The database may comprise logo data obtained from a variety of algorithms according to various embodiments, such as a key-point matching algorithm, a template matching algorithm, an edge matching algorithm, or a context matching algorithm.

An image containing an unidentified logo may be obtained from a network. Key points may be identified on each known logo in the database, as well as the unidentified logo. Groups of the key points in each known logo and the unidentified logo may be combined, and these combinations may be assembled to form a geometric shape, such as a triangle. The angle of each of the vertices of each geometric shape may then be calculated. A comparison may be conducted between the vertices of the geometric shape constructed from the unidentified logo and the vertices of the geometric shapes constructed from the known logos. Known logos for which the vertices do not match that of the unidentified logo are eliminated, and the resulting matching vertices identify the unidentified logo.

Various embodiments may utilize a variety of modules to generate social media analytics and calculate visual engagement with social media sites and engagement with individual posts within the social media sites. FIG. 1 schematically illustrates a system 100 according to various embodiments. Server hosting centers 105, 110 may host various components of the system 100, although in at least some embodiments, the system 100 may be hosted on a single hosting center (e.g., server hosting centers 105, 110). One or more social media application programming interfaces (APIs) 140 so scan or otherwise monitor social media sites 145. The API 140 may allow the system 100 to communicate with the social media sites 145. The API 140 may examine individual posts, collections of posts, or entire social media sites 145 for rich media 175 (e.g., images and video). Once rich media 175 (also referenced as rich data 175) is found, the API 140 may return the rich media 175 and pertinent information, such as a unique ID and the URL where the rich media 175 was found, to backend users 120. The backend users 120 may evaluate each rich media 175 returned by the API 140 and perform a variety of evaluation steps. After the evaluation by the backend users 120, the rich data 175 and accompanying information may be stored is a database 125. The database 125 may incorporate a MapReduce function 130 to filter and sort the data using, for example, a parallel, distributed algorithm to generate clustered data sets. Frontend users 115 may access the clustered data sets stored in the database 125 according to the functionality allowed by their subscription to the service.

In various embodiments, both the retrieved rich data 175 and evaluated rich data 175 and accompanying information may be distributed by a load balancer 150 to one or more servers 155 to even out the processing and storage loads among multiple hosting centers (e.g., server hosting centers 105, 110). The servers 155 may communicate with background processing APIs 160, such as but not limited to TaskQueue. A relational database management system 170 to manage storing and retrieving data as requested by backend users 120 and frontend users 115.

Figure 2:
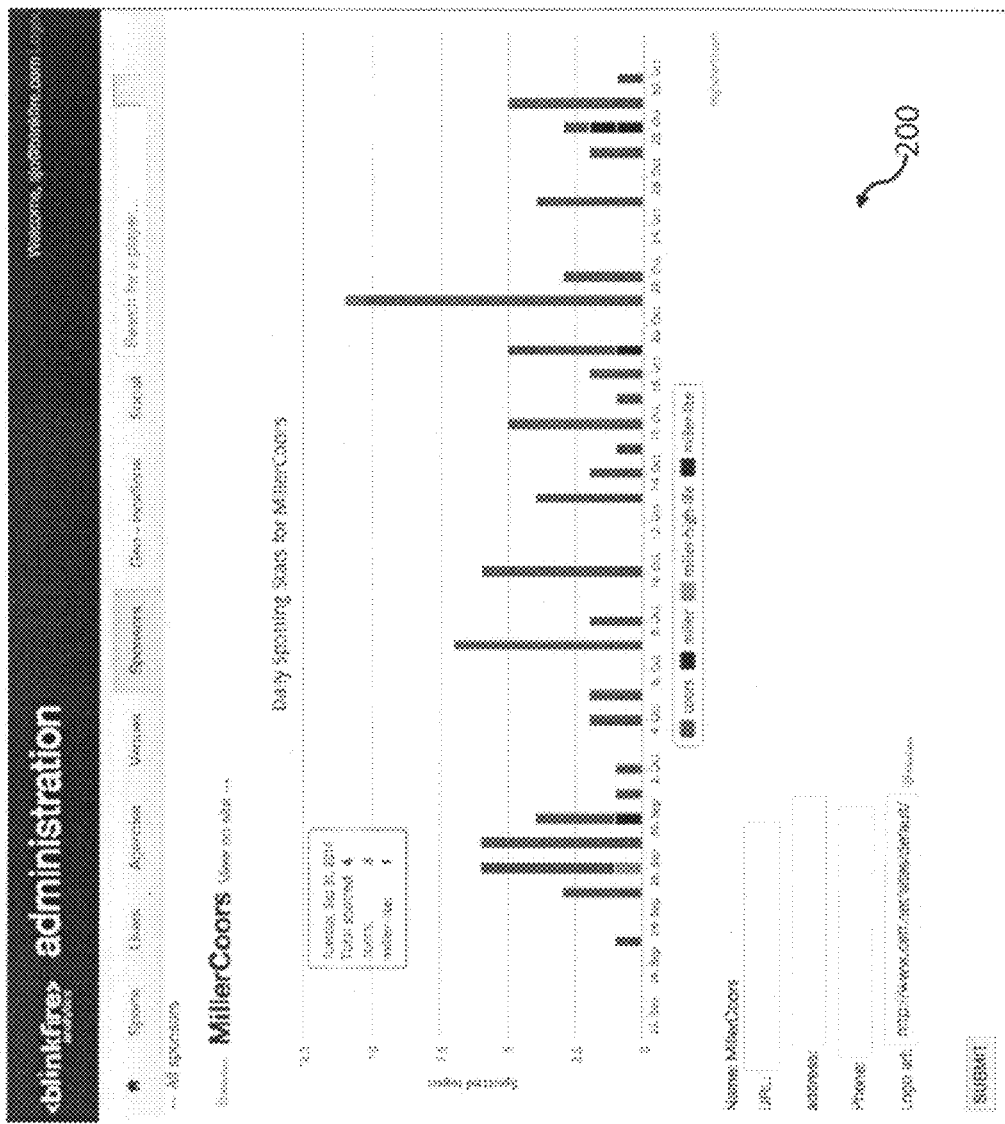
FIG. 2 is a screen shot of an exemplary system for scoring image engagement according to various embodiments.
Figure 3:
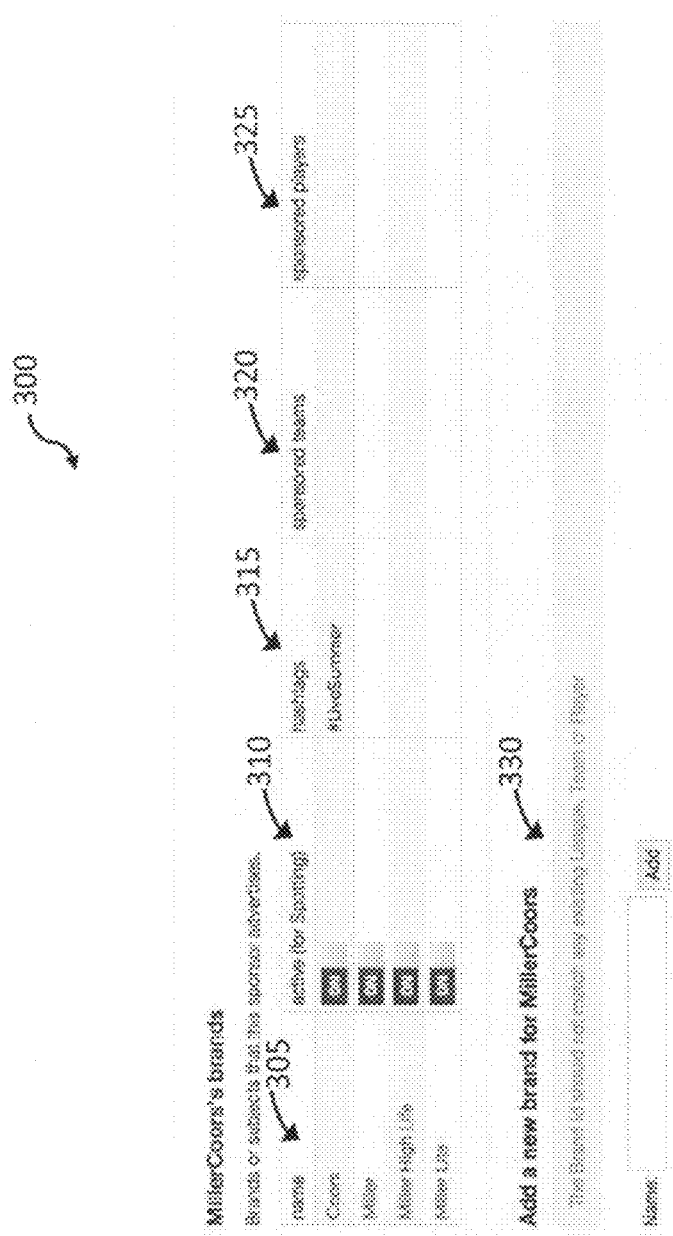
FIG. 3 is a screen shot of an exemplary system for scoring image engagement according to various embodiments.

FIG. 2 illustrates and exemplary screenshot 200 that may be obtained from the system 100 by a frontend user 115. In this particular instance, the screenshot 200 comprises statistics for the number of time a MillerCoors logo was spotted by the system 100 on social media sites 145. In order to generate visual representations of scoring of image engagement in digital media such as that illustrated by FIG. 2, a backend user 120 must initiate data input for specific digital media (e.g., a product name or logo) for which the frontend user 115 requests analytics. According to various embodiments, the backend user 120 may begin data input as illustrated by the exemplary screenshot 300 in FIG. 3. Here, the backend user 120 may view the name of logos, brands, persons, etc. (column 305) for which the system 100 is presently generating analytics. The screenshot 300 may also provide information on whether the system 100 is currently collecting data on the logo (column 310), whether specific hashtags are associated with the logo (column 315), and whether any teams or players are sponsored under the logo (columns 320, 325 respectively). At the bottom of the screenshot 300, the backend user 120 may have the capability of adding a new logo, brand, person, etc. 330 to be associated with MillerCoors.

Figure 4:
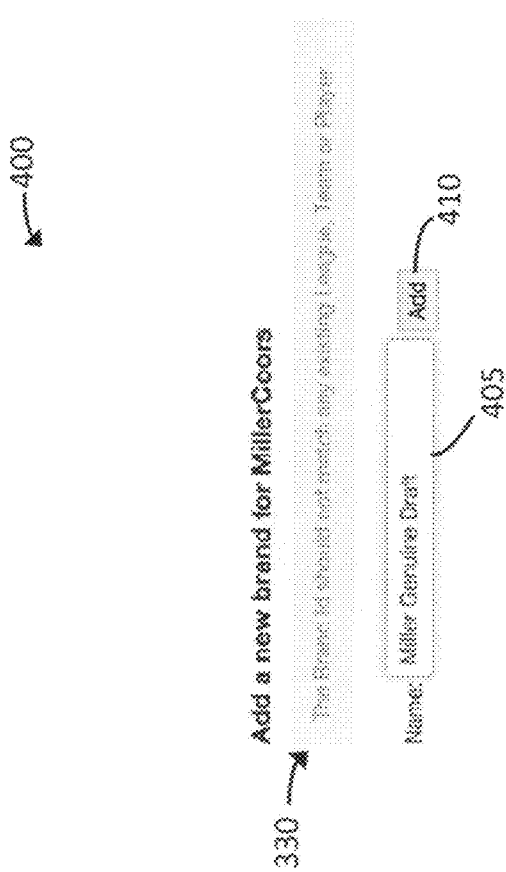
FIG. 4 is a screen shot of an exemplary system for scoring image engagement according to various embodiments.
Figure 5:
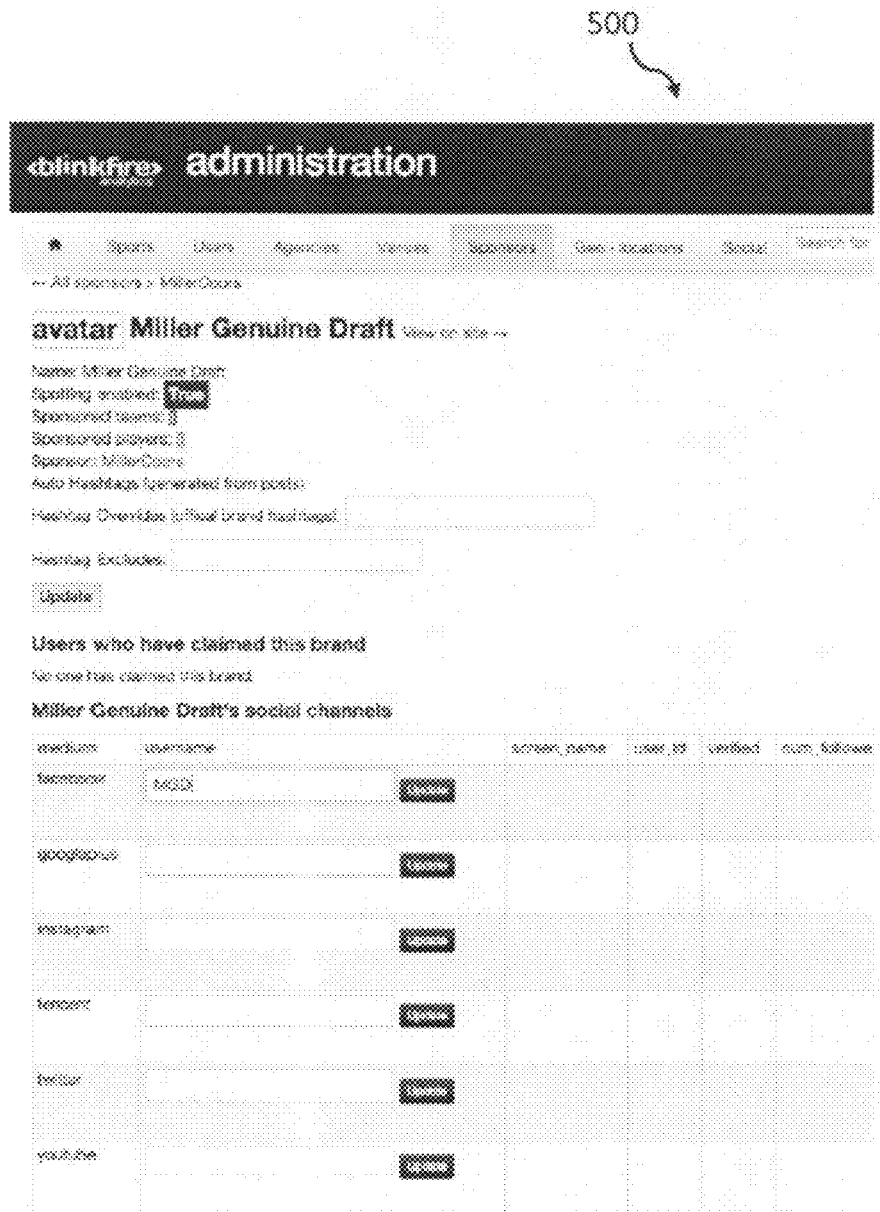
FIG. 5 is a screen shot of an exemplary system for scoring image engagement according to various embodiments.
Figure 6:
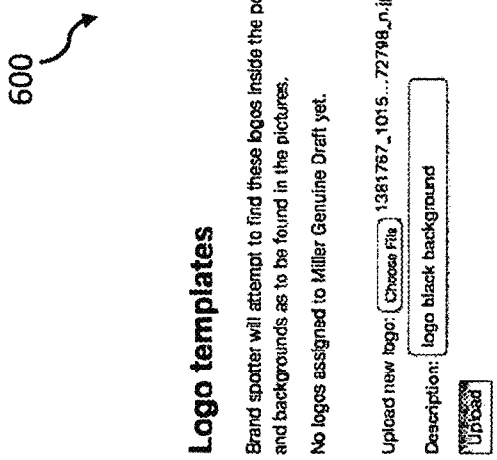
FIG. 6 is a screen shot of an exemplary system for scoring image engagement according to various embodiments.
Figure 7:
FIG. 7 is a screen shot of an exemplary system for scoring image engagement according to various embodiments.

Turning now to the exemplary screenshot 400 of FIG. 4, the backend user 120 may enter a name for the new logo, brand, person, etc. 330 into box 405 and then click the "add" button 410 to begin the process of adding the new name to the system 100. This process may continue as illustrated by the exemplary screenshot 500 of FIG. 5. The backend user 120 may enter known information on the social channels already in use for the new logo in order to more accurately direct the search functions of the API 140 of system 100. Additionally, as illustrated by the exemplary screenshot 600 of FIG. 6, the backend user 120 may enter into the system 100 one or more known logos (images or alphanumeric strings) associated with the new name. The system 100 may perform key point identification, geometric shape construction, and calculation of vertices for each known logo as described above and store this information in the database 125. FIG. 7 illustrates an exemplary screenshot 700 showing an uploaded logo 705 to be associated with the MillerCoors brand.

Figure 8:
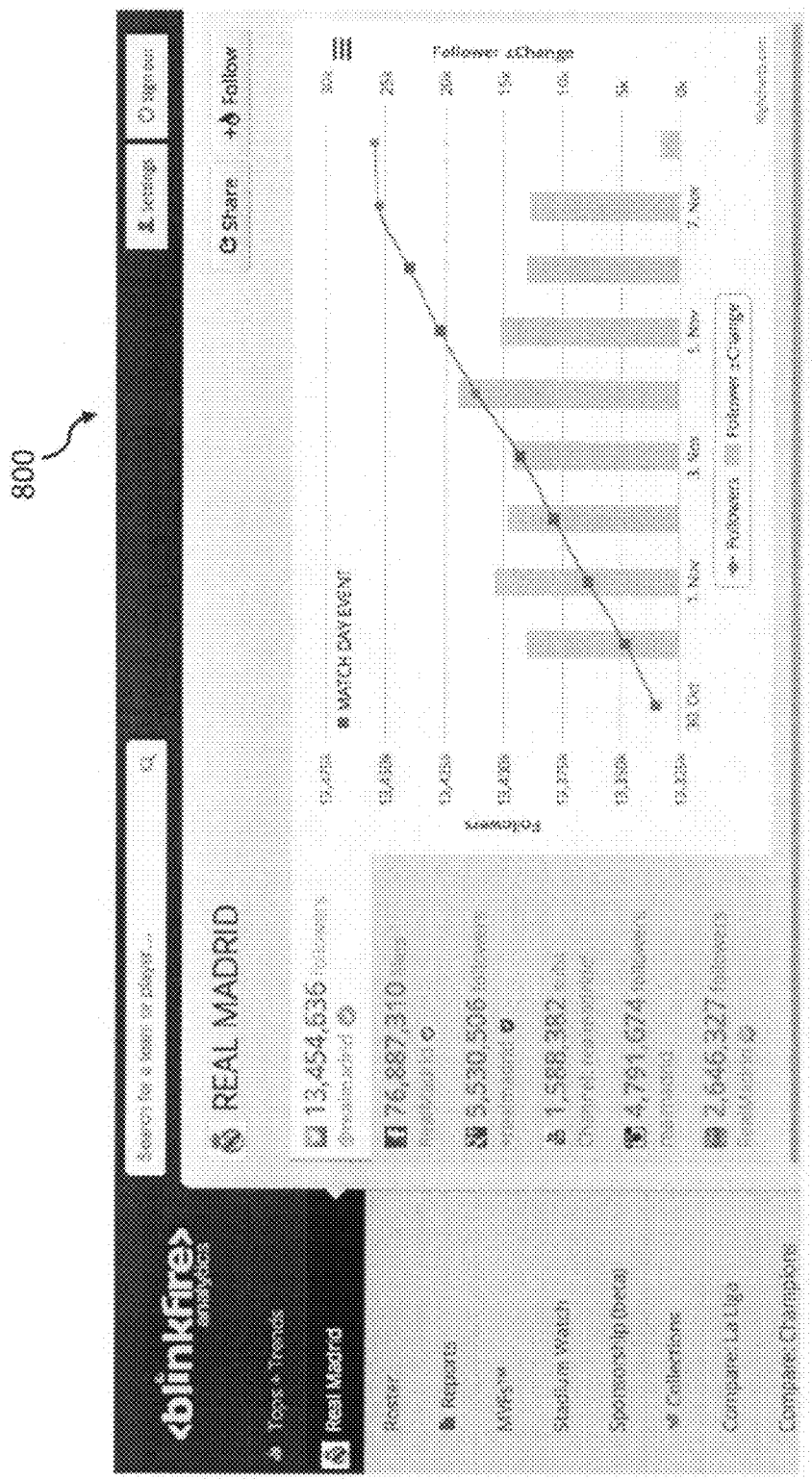
FIG. 8 is a screen shot of an exemplary system for scoring image engagement according to various embodiments.
Figure 9:
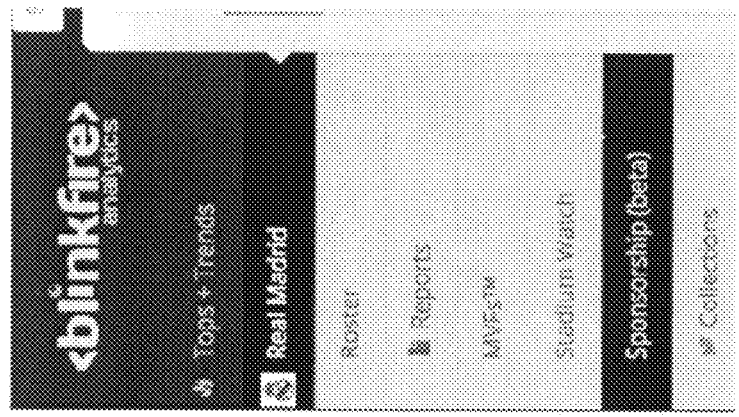
FIG. 9 is a screen shot of an exemplary system for scoring image engagement according to various embodiments.
Figure 10:
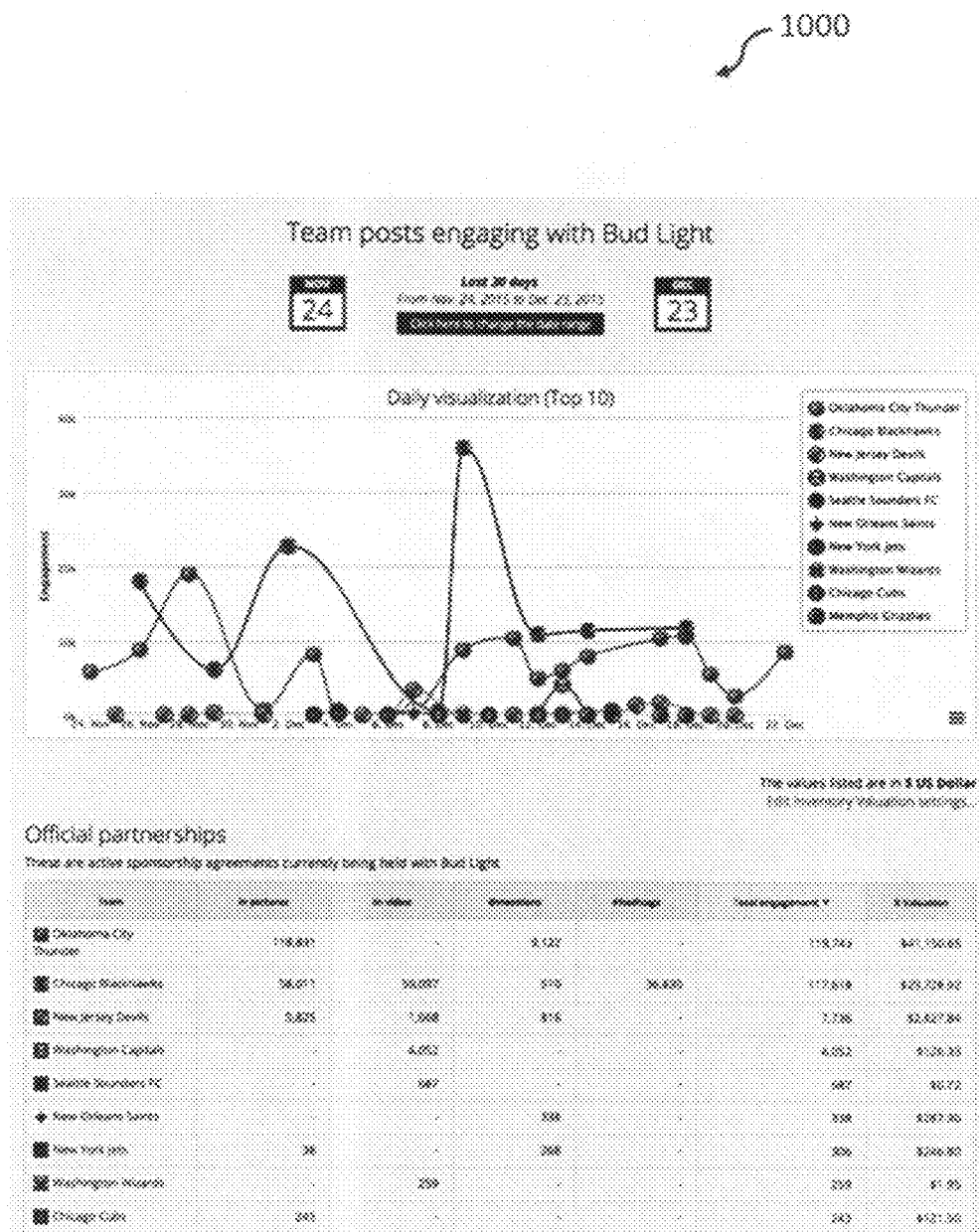
FIG. 10 is a screen shot of an exemplary system for scoring image engagement according to various embodiments.
Figure 11:
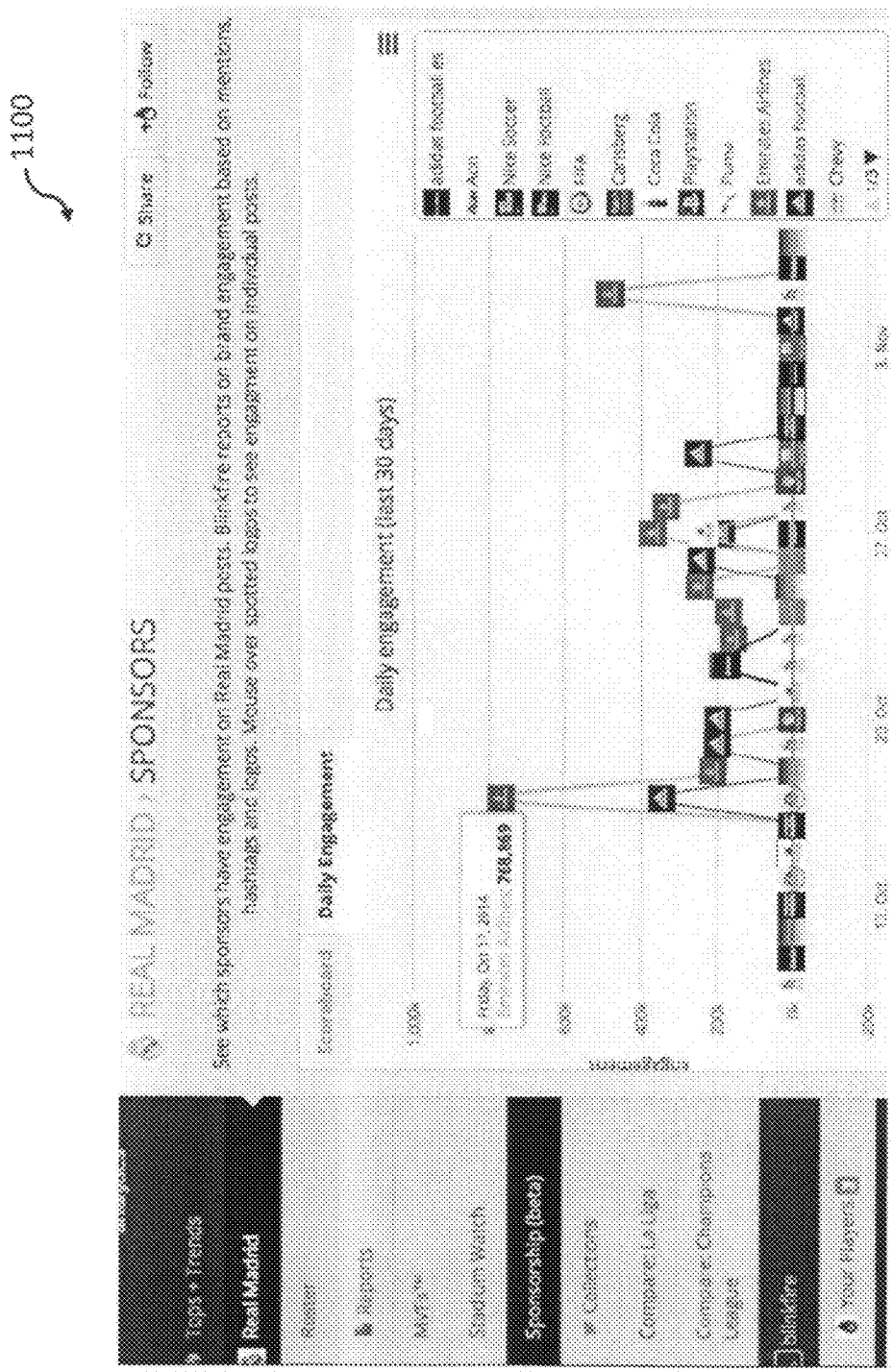
FIG. 11 is a screen shot of an exemplary system for scoring image engagement according to various embodiments.
Figure 12:
FIG. 12 is a screen shot of an exemplary system for scoring image engagement according to various embodiments.
Figure 13:
FIG. 13 is a screen shot of an exemplary system for scoring image engagement according to various embodiments.
Figure 14:
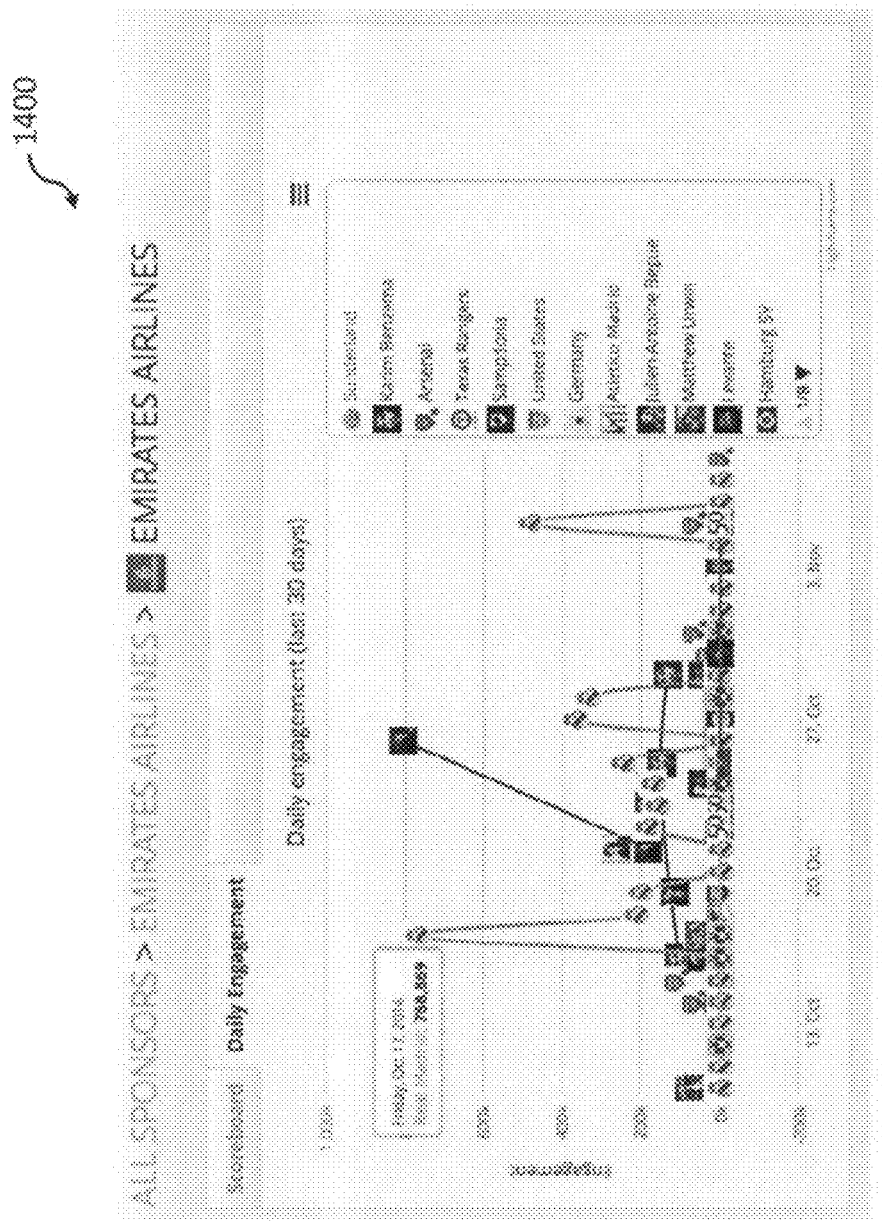
FIG. 14 is a screen shot of an exemplary system for scoring image engagement according to various embodiments.
Figure 15:
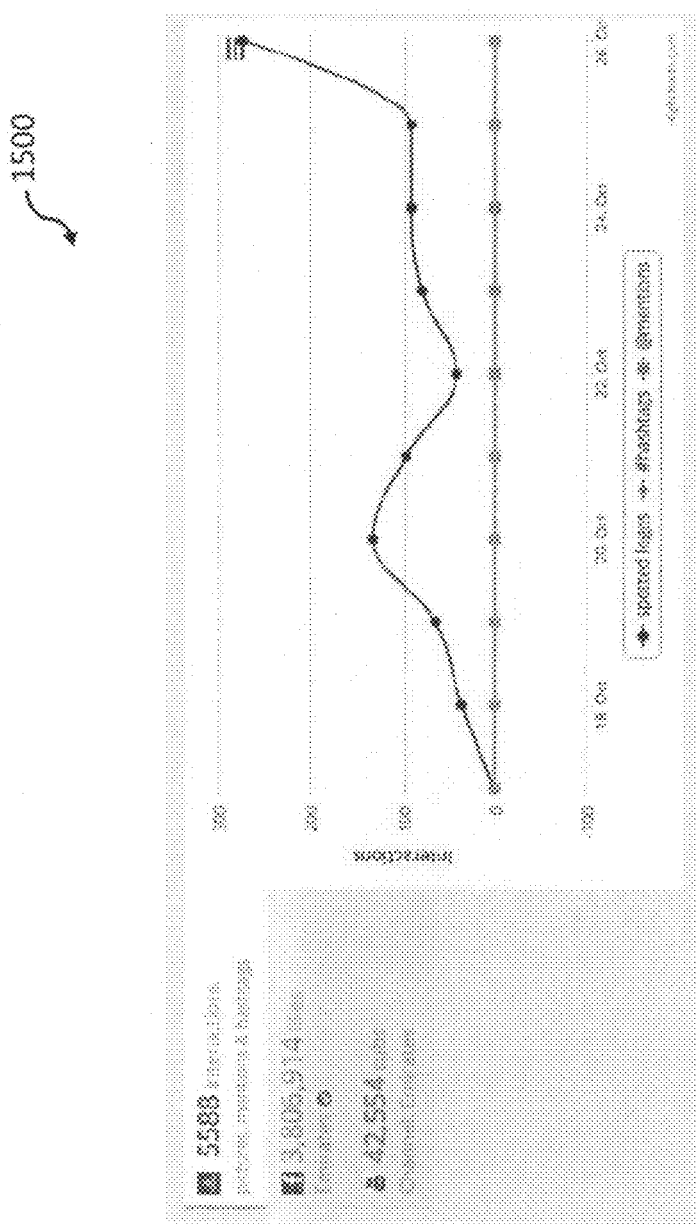
FIG. 15 is a screen shot of an exemplary system for scoring image engagement according to various embodiments.

FIG. 8 illustrates an exemplary screenshot 800 of visual representations of image engagement analytics data available to the frontend user 115. In this example, the frontend user 115 is presented with a graphical representation of the total number of social media followers of the football team Real Madrid across multiple social media channels, and how the total number of followers changed during a period of time surrounding a match day event. Alternatively, the menu represented by exemplary screenshot 900 of FIG. 9 allows the frontend user 115 to select from a variety of visual representation of image engagement analytics data. Clicking on the "sponsorship" button, for example, may result in the display of the information illustrated by exemplary screenshot 1000 of FIG. 10. In this example, a plurality of the Real Madrid team are listed, along with the number of times the system 100 has spotted a logo associated with each sponsor for a given time period. The brand engagement data may be broken down by occurrences in images or video, links to a social media site user, and metadata tags. FIG. 11 illustrates an exemplary screenshot 1100 of image engagement data for Real Madrid sponsors over a period of time. FIG. 12 provides an exemplary screenshot 1200 of three example social media posts 1205, 1210, 1215 from which raw data was obtained by the system 100. Each of the posts 1205, 1210, 1215 comprises an image 1225 in which algorithms of the system 100 have identified a logo 1220 of a Real Madrid sponsor, in this case Emirates Airlines. FIGS. 13 and 14 illustrate exemplary screenshots 1300, 1400 of image engagement data for a single sponsor, Emirates Airlines, similar to that shown for all Real Madrid sponsors in FIGS. 10 and 11. Yet additional image engagement data is illustrated for the Emirates Airline logo by the exemplary screenshot 1500 of FIG. 15.

In addition to the image engagement data discussed above (e.g., the number of occurrences of a logo in social media posts over a predetermined period of time), various embodiments may comprise analytical results to quantify brand exposure, quantify marketing exposure or assess social media engagement. For example, various embodiments may comprise an algorithm to determine the monetary value of the level of exposure to the public represented by the image engagement data. One exemplary algorithm to express the monetary value may comprise an estimation of the cost of advertisements to reach an equivalent number of people who engaged with or viewed the social media posts. The exemplary algorithm may also take into account geographic location, age, gender, income, occupation, or other demographic identifiers of the viewers of the social media posts. The exemplary algorithm may also take into account the cost of advertising during a particular event that was occurring during the time the social media posts were made. For example, various embodiments may track the image engagement data during a Real Madrid match. The exemplary algorithm may estimate the advertising costs or other costs that would have been incurred to reach an equivalent number of people had the advertising occurred during the broadcasts (including digital and social media channels) of the match.

Figure 16:
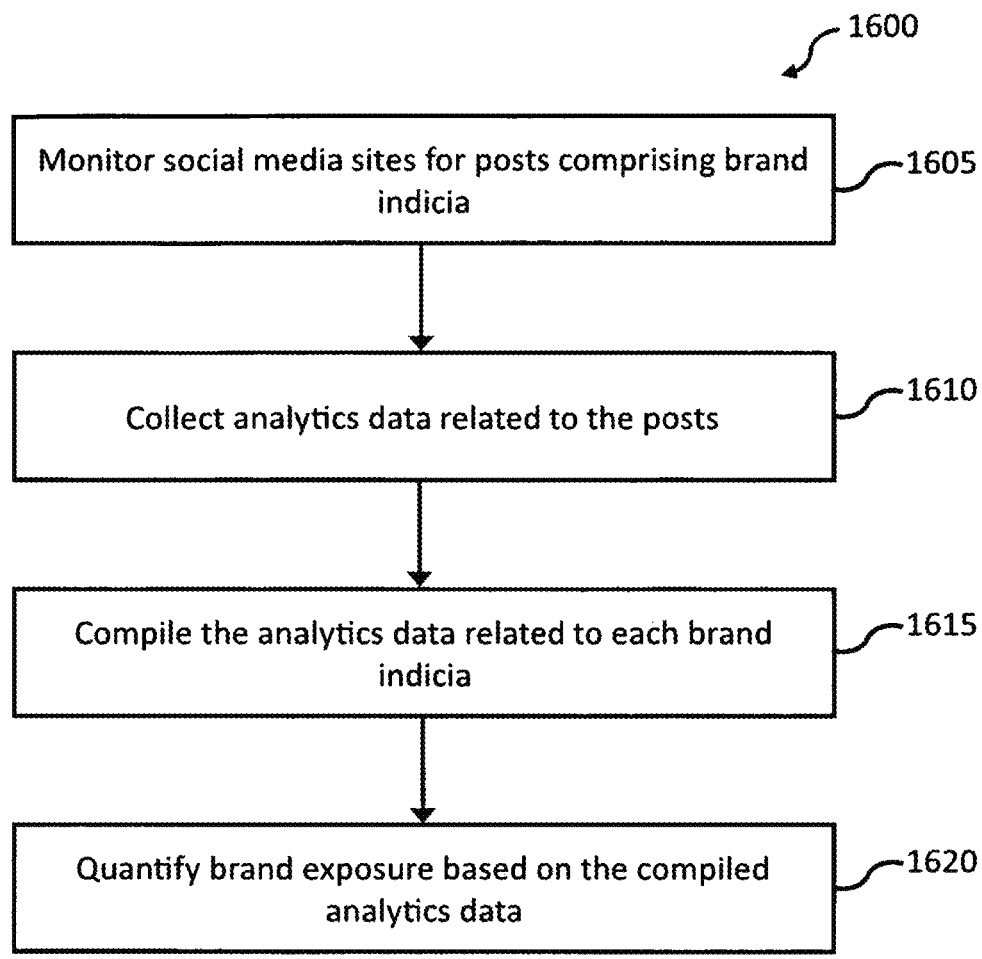
FIG. 16 is a flow diagram of an exemplary method for scoring image engagement according to various embodiments.

FIG. 16 illustrates a flow chart of an exemplary method 1600 for scoring image engagement in digital media. At step 1605, social media sites may be monitored for posts comprising brand indicia. Analytics data related to the social media posts may be collected at step 1610, and the analytics data related to each brand indicia may be compiled at step 1615. At step 1620, brand exposure may be quantified based on the compiled analytics data.

Figure 17:
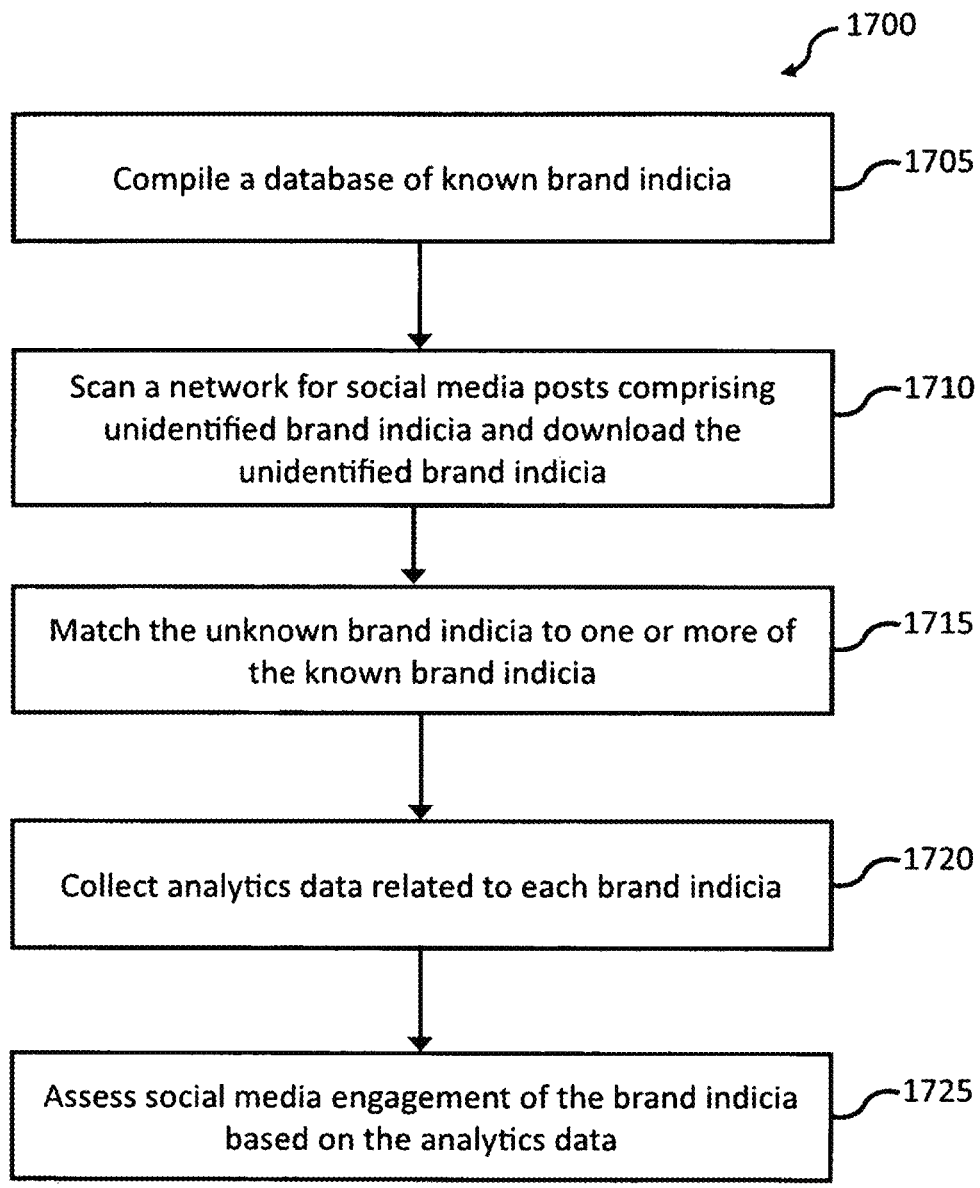
FIG. 17 is a flow diagram of an exemplary method for scoring image engagement according to various embodiments.

FIG. 17 illustrates a flow chart of an exemplary method 1700 for scoring image engagement in digital media. At step 1705, a database of known brand indicia may be compiled. At step 1710, a network may be scanned for social media posts comprising unidentified brand indicia, and then the unidentified brand indicia may be downloaded. The unknown brand indicia may be matched at step 1715 to one or more of the known brand indicia. Analytics data related to each brand indicia may be collected at step 1720, and social media engagement of the brand indicia may be assessed at step 1725 based on the analytics data.

Figure 18:
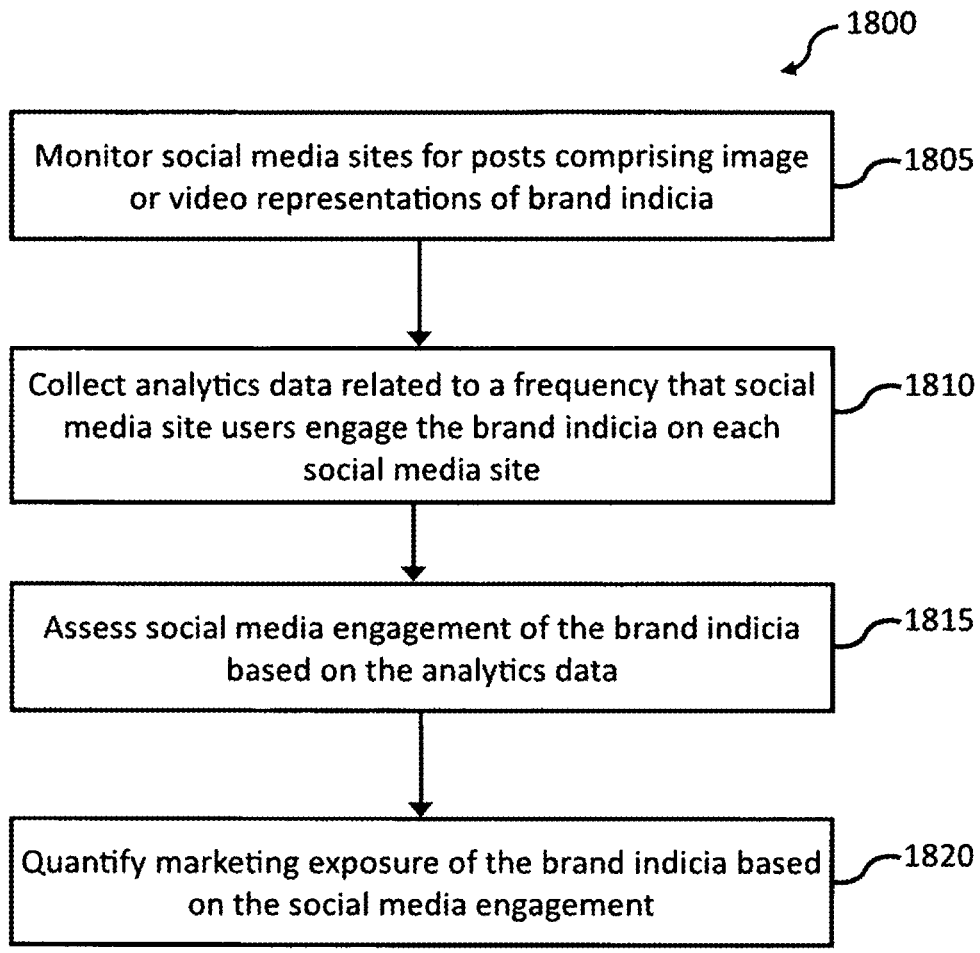
FIG. 18 is a flow diagram of an exemplary method for scoring image engagement according to various embodiments.

FIG. 18 illustrates a flow chart of an exemplary method 1800 for scoring image engagement in digital media. At step 1805, social media sites may be monitored for posts comprising image or video representations of brand indicia. At step 1810, analytics data related to a frequency that social media site users engage the brand indicia on each social media site may be collected. Social media engagement of the brand indicia may be assessed at step 1815 based on the analytics data. Marketing exposure of the brand indicia may be quantified based on the social media engagement at step 1820.

Figure 19:
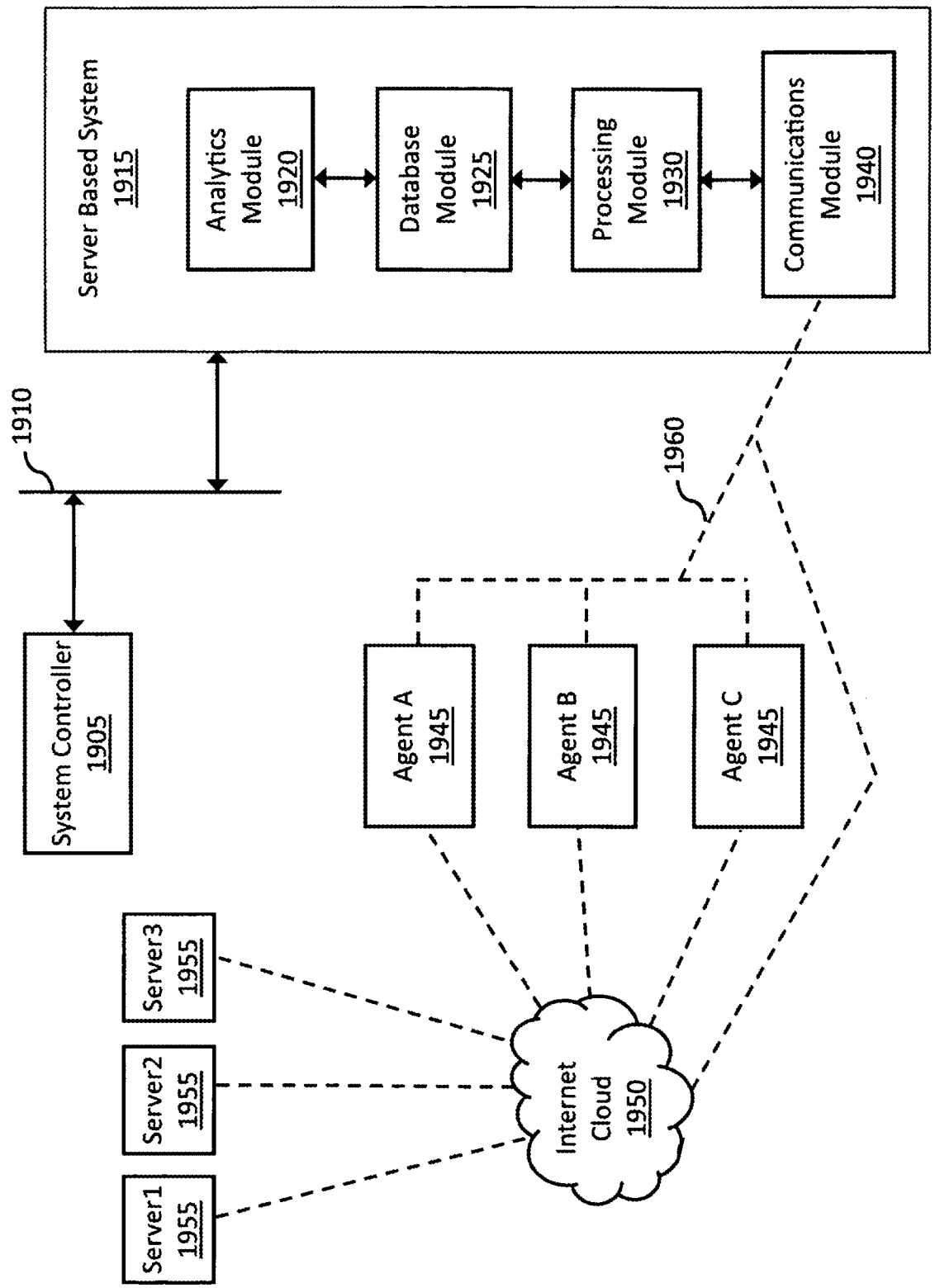
FIG. 19 is a schematic diagram of a system architecture for a secure autonomous intelligent agent server according to various embodiments.

FIG. 19 illustrates a schematic diagram of a system architecture for a secure autonomous intelligent agent server capable of implementing the methods of the present disclosure. A system controller 1905 may be coupled to a server based system 1915 by a bus 1910, or any other connection device known in the art. The system controller 1905 may comprise a specialized chip capable of executing non-transitory computer readable media to perform one or more of the methods 1600, 1700, 1800.

The server based system 1915 may comprise executable instruction contained at least partially on the non-transitory computer readable media. A database module 1925 may be configured to receive information, as well as new and updated information, store and organize the information, and retrieve the information. The information stored in the database module 1925 may comprise, for example, data related to scoring image engagement in digital media. The database module 1925 may comprise a relational database such that relationships between the data are maintained.

A processing module 1930 may also be present within the server based system 1915 that is communicatively coupled to the database module 1925. The processing module 1930 may execute requests to enter data, retrieve data, analyze data, and handle other operational requests.

Additionally, the server based system 1915 may further comprise a communications module 1940 communicatively coupled to the processing module 1930. The communications module may also be communicatively coupled to a plurality of agents 1945, which may be intelligent agents 1945 (e.g., Agent A 1945, Agent B 1945, and Agent C 1945), as well as communicatively coupled to the Internet such as through a cloud-based computing environment 1950 (also referenced as cloud 1950) that may include servers 1955.

The server based system 1915 may also comprise an analytics module 1920 communicatively coupled to the database module 1925. The analytics module may contain and/or process algorithms or other analytical techniques or methods. Processing the algorithms may involve the information stored in the database module 1925.

The agents 1945 may be communicatively coupled to one or more servers 1955 external to the server based system 1915. The servers may contain the information obtained as described above for methods 1600, 1700, and 1800. The agents 1945 may acquire the desired information from the servers 1955 and transfer the information to the database module 1925 via the communications module 1940 and the processing module 1930. The agents 1945 may acquire the information by executing queries, scraping a network, crawling a network, data mining, data aggregation, or any other data acquisition techniques or methods known in the art.

The system controller 1905 may be communicatively coupled to the communications module 1940, through which the system controller 1905 may communicate via a network 1960 with one or more intelligent agents 1945 and/or the external servers 1955. The network 1960 can be a cellular network, the Internet, an Intranet, or other suitable communications network, and can be capable of supporting communication in accordance with any one or more of a number of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth, Wireless LAN (WLAN) protocols/techniques.

The intelligent agent 1945, according to some exemplary embodiments, may be a non-generic computing device comprising non-generic computing components. The intelligent agent 1945 may comprise dedicated hardware processors to determine, transmit, and receive video and non-video data elements. In further exemplary embodiments, the intelligent agent 1945 may comprise a specialized device having circuitry and specialized hardware processors, and is artificially intelligent, including machine learning. Numerous determination steps by the intelligent agent 1945 as described herein can be made to video and non-video data by an automatic machine determination without human involvement, including being based on a previous outcome or feedback (e.g., automatic feedback loop) provided by the networked architecture, processing and/or execution as described herein.

According to various embodiments, the system controller 1905 may communicate with a cloud-based computing environment 1950 (including servers 1955) that collects, processes, analyzes, and publishes datasets. In general, the cloud-based computing environment 1950 (including servers 1955) may be a resource that typically combines the computational power of a large grouping of processors and/or that combines the storage capacity of a large group of computer memories or storage devices. For example, systems that provide a cloud resource can be utilized exclusively by their owners, such as Google™ or Amazon™, or such systems can be accessible to outside users who deploy applications within the computing infrastructure to obtain the benefits of large computational or storage resources.

The cloud 1950 can be formed, for example, by a network of web servers with each server (or at least a plurality thereof) providing processor and/or storage resources. These servers can manage workloads provided by multiple users (e.g., cloud resource customers or other users). Typically, each user places workload demands upon the cloud 1950 that vary in real-time, sometimes dramatically. The nature and extent of these variations typically depend upon the type of business associated with each user.

Some of the above-described functions can be composed of instructions that are stored on storage media (e.g., computer-readable media). The instructions can be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable medium" and "computer-readable media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic media, a CD-ROM disk, digital video disk (DVD), any other optical media, any other physical media with patterns of marks or holes, a RAM, a PROM, an EPROM, an EEPROM, a FLASHEPROM, any other memory chip or data exchange adapter, a carrier wave, or any other media from which a computer can read.

Various forms of computer-readable media can be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While the present disclosure has been described in connection with a series of preferred embodiments, these descriptions are not intended to limit the scope of the disclosure to the particular forms set forth herein. The above description is illustrative and not restrictive. Many variations of the embodiments will become apparent to those of skill in the art upon review of this disclosure. The scope of this disclosure should, therefore, be determined not with reference to the above description, but instead should be determined with reference to the appended claims along with their full scope of equivalents. The present descriptions are intended to cover such alternatives, modifications, and equivalents as can be included within the spirit and scope of the disclosure as defined by the appended claims and otherwise appreciated by one of ordinary skill in the art. In several respects, embodiments of the present disclosure can act to close the loopholes in the current industry practices in which good business practices and logic are lacking because it is not feasible to implement with current resources and tools.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

What is claimed is:

1. A computer-implemented method comprising:
    monitoring, using a secure autonomous intelligent server, a plurality of Internet social media sites for posts comprising at least one predetermined brand logo associated with a commercial brand, the at least one predetermined brand logo comprising at least one metadata tag;
    collecting, using the secure autonomous intelligent server and a relational database, analytics data related to the posts and the at least one predetermined brand logo;
    compiling, using the secure autonomous intelligent server, the analytics data related to each at least one predetermined brand logo;
    quantifying a monetary value, using the secure autonomous intelligent server, of brand exposure for each brand associated with the at least one predetermined brand logo, the quantification based on the compiled analytics data; and
    matching, using the secure autonomous intelligent server, at least one unidentified brand logo as being associated with the at least one predetermined brand logo, the matching comprising:
        determining a plurality of key points on each logo;
        combining groups of the key points on each logo;
        matching a geometric shape generated by the groups of the key points on each logo;
        calculating an angle of each of the vertices of the geometric shape generated by the groups of the key points on each logo;
        comparing the angle of each of the vertices of the geometric shape generated by the groups of the key points on each logo;
        eliminating known logos that do match for the comparing the angle of each of the vertices of the geometric shape generated by the groups of the key points on each logo; and
        identifying the at least one unidentified brand logo as being associated with the at least one predetermined brand logo based on the comparing the angle of each of the vertices of the geometric shape generated by the groups of the key points on each logo.

2. The method of claim 1, wherein the at least one metadata tag comprise hashtags.

3. The method of claim 1, wherein the at least one metadata tag comprise a link to a social media site user.

4. The method of claim 1, wherein the posts comprise alphanumeric data.

5. The method of claim 1, wherein the posts comprise rich media.

6. The method of claim 1, wherein monitoring social media sites comprises monitoring the social media sites via an application programming interface.

7. The method of claim 1, wherein quantifying brand exposure is based at least in part on a number of times the at least one predetermined brand logo appears in the posts over a predetermined period of time.

8. The method of claim 1, wherein quantifying brand exposure is based at least in part on determining whether each of the posts comprising the at least one predetermined brand logo portrays the brand positively.

9. The method of claim 1, wherein quantifying brand exposure comprises determining the number of times the at least one predetermined brand logo appears in at least one image in the posts over a predetermined period of time.

10. The method of claim 1, wherein quantifying brand exposure comprises comparing a number of times a first brand logo appears in the posts over a predetermined period of time compared to a second brand logo, the second brand logo corresponding to a second brand that is a commercial competitor to a first brand associated with the first brand logo.

11. The method of claim 1, wherein quantifying brand exposure comprises determining a number of times the at least one predetermined brand logo appears in posts during a predetermined time period before, during, and after an event of a finite duration.

12. The method of claim 11, wherein the event is a sporting event.

13. The method of claim 11, wherein the event is a marketing campaign.

14. A computer-implemented method comprising:
    compiling, using a secure autonomous intelligent server, a database of a plurality of known brand logos, each known brand logo associated with a commercial brand;
    scanning, using the secure autonomous intelligent server, a network for social media posts comprising at least one unidentified brand logo and downloading the at least one unidentified brand logo from the network;
    matching, using the secure autonomous intelligent server, the at least one unidentified brand logo as being associated with a same commercial brand as one or more of the known brand logos, the matching comprising:
        determining a plurality of key points on each logo;
        combining groups of the key points on each logo;
        matching a geometric shape generated by the groups of key points on each logo;
        calculating an angle of each of the vertices of the geometric shape generated by the groups of key points on each logo;
        comparing the angle of each of the vertices of the geometric shape generated by the groups of key points on each logo;
        eliminating known logos that do match for the comparing the angle of each of the vertices of the geometric shape generated by the groups of key points on each logo; and
        identifying the at least one unidentified brand logo as being associated with one or more of the known brand logos based on the comparing the angle of each of the vertices of the geometric shape generated by the groups of key points on each logo;
    collecting, using the secure autonomous intelligent server and a relational database, analytics data related to each brand from the matched brand logo; and assessing, using the secure autonomous intelligent server, social media engagement of the matched brand logo based on the analytics data, the matched brand logo comprising metadata tags.

15. The method of claim 14, wherein the metadata tags comprise hashtags.

16. The method of claim 14, wherein the metadata tags comprise a link to a social media site user.

17. The method of claim 14, wherein the social media posts comprise alphanumeric data.

18. The method of claim 14, wherein the social media posts comprise rich media.

19. The method of claim 14, wherein scanning a network for social media posts comprises scanning social media sites via an application programming interface.

20. The method of claim 14, wherein assessing social media engagement comprises determining a number of times the one or more known brand logos appear in the social media posts over a predetermined period of time.

21. The method of claim 14, wherein assessing social media engagement comprises determining whether each social media post comprising the one or more known brand logos portrays the associated commercial brand positively.

22. The method of claim 14, wherein assessing social media engagement comprises determining a number of times the one or more known brand logos appear in at least one image in the social media posts over a predetermined period of time.

23. The method of claim 14, wherein assessing social media engagement comprises comparing a number of times a first known brand logo appears in the social media posts over a predetermined period of time compared to a second known brand logo, the second known brand logo corresponding to a second brand that is a commercial competitor to a first brand associated with the first known brand logo.

24. The method of claim 14, wherein assessing social media engagement comprises determining a number of times the one or more known brand logos appears in the social media posts during a predetermined time period before, during, and after an event of a finite duration.

25. The method of claim 24, wherein the event is a sporting event.

26. The method of claim 24, wherein the event is a marketing campaign.

27. A computer-implemented method comprising:
monitoring, using a secure autonomous intelligent server, social media sites for posts comprising image or video representations of at least one brand logo associated with a commercial brand, the at least one brand logo comprising metadata tags;
collecting, using the secure autonomous intelligent server and a relational database, analytics data related to a frequency that social media site users engage the at least one brand logo on each social media site;
assessing, using the secure autonomous intelligent server, social media engagement of the at least one brand logo based on the analytics data;
quantifying, using the secure autonomous intelligent server, marketing exposure of the at least one brand logo based on the social media engagement; and
matching, using the secure autonomous intelligent server, at least one unidentified brand logo as being associated with the at least one brand logo, the matching comprising:
determining a plurality of key points on each logo;
combining groups of the key points on each logo;
matching a geometric shape generated by the groups of key points on each logo, the geometric shape being a triangle;
calculating an angle of each of the vertices of the triangle generated by the groups of key points on each logo;
comparing the angle of each of the vertices of the triangle generated by the groups of key points on each logo;
eliminating known logos that do match for the comparing the angle of each of the vertices of the triangle generated by the groups of key points on each logo; and
identifying the at least one unidentified brand logo as being associated with the at least one brand logo based on the comparing the angle of each of the vertices of the triangle generated by the groups of key points on each logo.

28. The method of claim 27, wherein the metadata tags comprise hashtags.

29. The method of claim 27, wherein the metadata tags comprise a link to a social media site user.

30. The method of claim 27, wherein the posts comprise alphanumeric data.

31. The method of claim 27, wherein the posts comprise rich media.

32. The method of claim 27, wherein monitoring social media sites comprises monitoring the social media sites via an application programming interface.

33. The method of claim 27, wherein quantifying marketing exposure comprises determining a number of times the at least one brand logo appears in the social media posts over a predetermined period of time.

34. The method of claim 27, wherein quantifying marketing exposure comprises determining whether each post comprising the at least one brand logo portrays the associated commercial brand positively.

35. The method of claim 27, wherein quantifying marketing exposure comprises determining a number of times the at least one brand logo appears in at least one image in the social media posts over a predetermined period of time.

36. The method of claim 27, wherein quantifying marketing exposure comprises comparing a number of times a first brand logo appears in the social media posts over a predetermined period of time compared to a second brand logo, the second brand logo corresponding to a second commercial brand that is a commercial competitor to a first commercial brand associated with the first brand logo.

37. The method of claim 27, wherein quantifying marketing exposure comprises determining a number of times the at least one brand logo appears in social media posts during a predetermined time period before, during, and after an event of a finite duration.

38. The method of claim 37, wherein the event is a sporting event.

39. The method of claim 37, wherein the event is a marketing campaign.

40. Non-transitory computer readable media as executed by a system controller comprising a specialized chip to perform a method, the method comprising:
monitoring, using a secure autonomous intelligent server, social media sites for posts comprising at least one brand logo associated with a commercial brand, the at least one brand logo comprising metadata tags;
collecting, using the secure autonomous intelligent server and a relational database, analytics data related to the posts and the at least one brand logo;

compiling, using the secure autonomous intelligent server, the analytics data related to each at least one brand logo;

quantifying, using the secure autonomous intelligent server, brand exposure for each brand associated with the at least one brand logo, the quantification based on the compiled analytics data; and matching, using the secure autonomous intelligent server, at least one unidentified brand logo as being associated with the at least one brand logo, the matching comprising:

determining a plurality of key points on each logo;

combining groups of the key points on each logo;

matching a geometric shape generated by the groups of key points on each logo, the geometric shape being a triangle;

calculating an angle of each of the vertices of the triangle generated by the groups of key points on each logo;

comparing the angle of each of the vertices of the triangle generated by the groups of key points on each logo;

eliminating known logos that do match for the comparing the angle of each of the vertices of the triangle generated by the groups of key points on each logo; and identifying the at least one unidentified brand logo as being associated with the at least one brand logo based on the comparing the angle of each of the vertices of the triangle generated by the groups of key points on each logo.

41. The method of claim 1, wherein the monitoring a plurality of Internet social media sites for posts comprising at least one predetermined brand logo comprises monitoring a brand logo of each of a plurality of different brands in a predetermined group of brands.

42. The method of claim 41, wherein the predetermined group of brands is a group of sponsors for a same team, league, or sport type.

43. The method of claim 11, further comprising: determining a monetary value of the brand exposure during the event, and comparing the monetary value of the brand exposure to an advertising cost of advertising during the event.

* * * * *